United States Patent [19]

Soethout

[11] Patent Number: 4,915,021
[45] Date of Patent: Apr. 10, 1990

[54] AIR OUTLET FOR AN INTERIOR SPACE, ESPECIALLY FOR THE INTERIOR SPACE OF A MOTOR VEHICLE

[75] Inventor: Freddie Soethout, Pulheim, Fed. Rep. of Germany

[73] Assignee: Siemens Aktiengesellschaft, Berlin & Munich, Fed. Rep. of Germany

[21] Appl. No.: 368,848

[22] Filed: Jun. 20, 1989

[30] Foreign Application Priority Data

Jun. 20, 1988 [DE] Fed. Rep. of Germany ....... 3821110

[51] Int. Cl.⁴ ......................... B60H 1/34; F24F 13/15
[52] U.S. Cl. ........................................... 98/2; 98/40.24
[58] Field of Search ....................... 98/2, 40.12, 40.13, 98/40.24, 40.26, 110, 121.2

[56] References Cited

U.S. PATENT DOCUMENTS 2,891,462  6/1959  Petrie .................................. 98/40.24
2,947,237  8/1960  O'Day ................................. 98/40.12

FOREIGN PATENT DOCUMENTS 466309   10/1951  Italy .................................... 98/40.24
79105    9/1955   Netherlands ....................... 98/40.24
7513520  5/1976   Netherlands ....................... 98/40.12
1365681  9/1974   United Kingdom ............... 98/40.24

Primary Examiner—Harold Joyce
Attorney, Agent, or Firm—Kenyon & Kenyon

[57] ABSTRACT

An air outlet (1) includes a housing (2) with vanes that swivel together in the housing. The vanes consist of plates (3 to 7), which, in the closed position of the plates, abut against each other with their longitudinal edges. Each plate is provided with several duct-type openings, the axes of which form an angle of 30° to 60° with the plate surface. In the closed position of the plates, the air outlet thus obtains an additional jet characteristic.

10 Claims, 5 Drawing Sheets

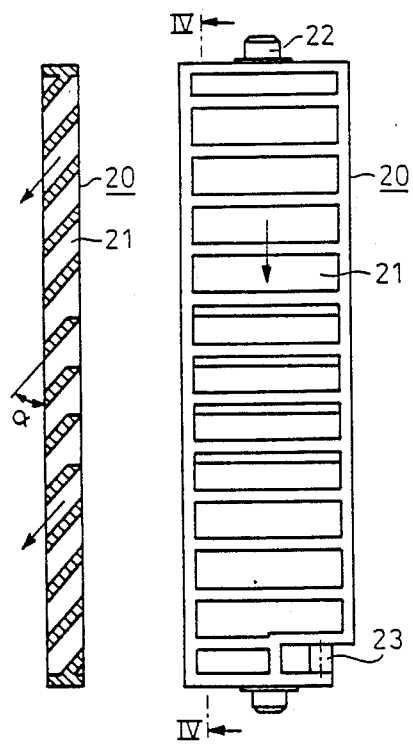
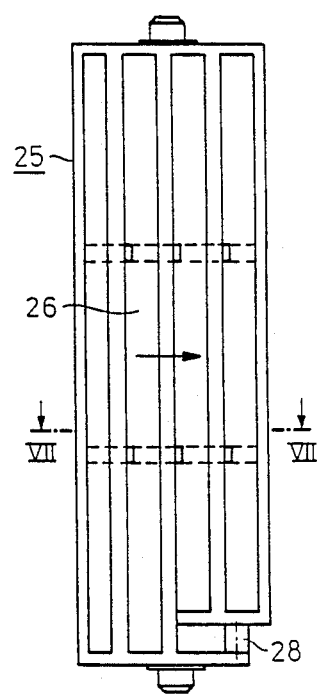
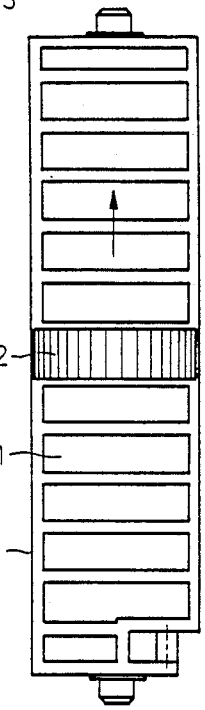
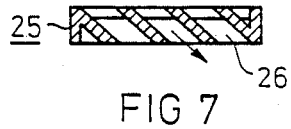
FIG 4　FIG 5
FIG 6
FIG 7
FIG 8

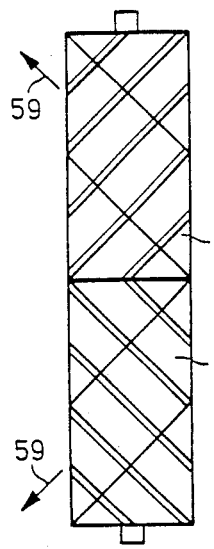
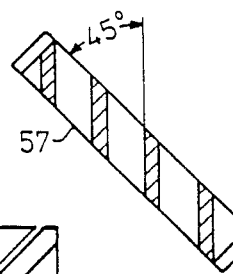
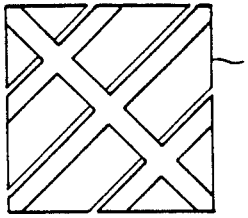
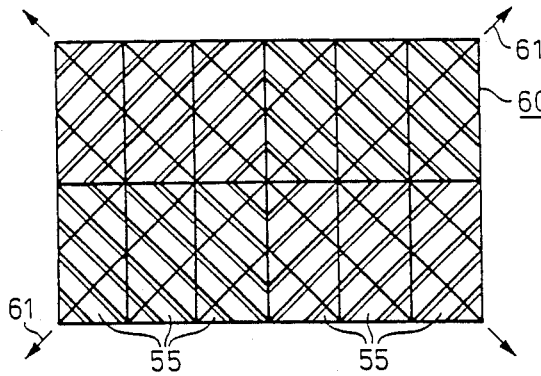
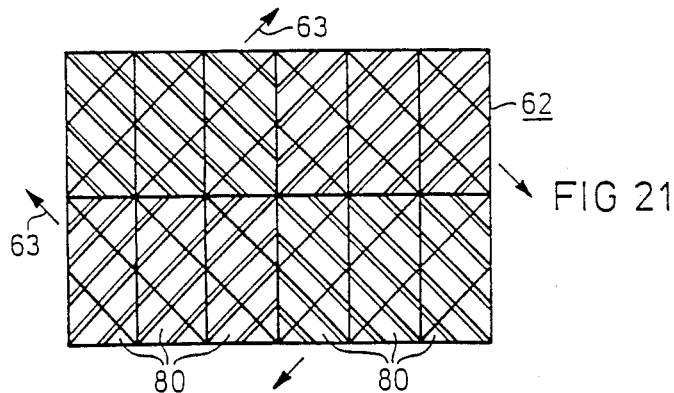

AIR OUTLET FOR AN INTERIOR SPACE, ESPECIALLY FOR THE INTERIOR SPACE OF A MOTOR VEHICLE

BACKGROUND OF THE INVENTION

1. Field of the Invention

The invention lies in the field of the ventilation for interior spaces. Its application is intended for the design of air outlets having a characteristic exhaust property which can be varied by means of pivoting vanes. These types of air outlets are especially suited for application in motor vehicles.

2. Related Art

German Published Patent Application No. 29 36 185 discloses an air outlet used to ventilate a motor vehicle, the air outlet consisting of a vertically swivelling housing with several vanes arranged in the housing. The vanes are coupled to each other and pivot together in the housing. For the most part, the surfaces of the vanes have a rectangular shape, while in cross-section, the vanes have a double-wedge form. In the closed state of the air outlet, the lateral edges of the vanes overlap each other.

In German Pat. No. 35 29 463, another air outlet of this type is described as a louver outlet or shutter nozzle, the vanes are designed and arranged in a way which allows nondirectional edge flows to be avoided. Thus, an especially good directional effect is attained. In this connection, the vanes can be aligned toward a common center, whereby a distinctly concentrated or a pronounced, divergent exhaust flow is generated.

With an air outlet disclosed in German Published Patent Application No. 24 44 116, either a concentrated or a diverging air jet can be generated. For this purpose, the exhaust port of the air outlet is subdivided by flexible air baffles in a lattice form into a greater number of air guide ducts. By convexly deforming the lattice to give the air outlet the form of a spherical segment, certain air baffles can be inclined relative to the axis of the air outlet. The result is that the exhaust directions of the air guide ducts diverge from the axis of the air outlet, so that an air jet emerges from the air outlet fanned out in different directions of flow. To adjust this air jet, the air baffles are mounted on two bowed spring wires, Which are arranged crosswise. The baffles are preferably components of a one-piece grid made of a flexible rubberlike material, through Which the bowed wires pass. The ends of the spring wires fit into sockets that are spaced apart by less than the length of the wires, thereby causing the wires to bow. When the wires bow inwardly, the grid is flat. When they bow outwardly, the grid assumes a convex spherical form.

Finally, German Pat. No. 25 25 917 and related German Published Patent Application No. 27 02 334 disclose an adjustable air outlet for ventilating or air-conditioning an individual workstation in a room. It has two discharge zones arranged concentrically to each other. Both discharge zones are subdivided into several outlet ducts, which are defined respectively by an inner and an outer wall area and by air baffles formed by blades. The blades of the outer discharge zone can be adjusted diagonally, giving the air jets a turbulent swirl effect. The inner discharge zone can be provided with a movable insert to adjust the air flow.

SUMMARY OF THE INVENTION

The object of the invention is to design an air outlet having a housing containing a number of rectangular vanes mounted and coupled together for pivoting angular adjustment in the housing, so that without additional service or technical expenditures, a compact jet discharge with directional capability, as well as a diffused discharge, especially a diverging, diffused discharge can be adjusted.

To meet this objective, the invention provides vanes in the form of plates, each plate having a width equal, at the most, to the inside width of the air outlet divided by the number of plates, and each plate being provided with several duct-type openings having axes which form an angle of between 30° and 60° with the plate plane.

When the vanes or plates of a thus designed air outlet are closed, the air flows in a diffused state through the duct-type openings into the space to be ventilated; the diffused air discharge is attained as a result of the axial inclination of the openings relative to the respective plate plane and thus—in the closed state of the plates—relative to the exhaust surface of the air outlet. This inclination is preferably selected so that the axes of the openings form a 35° to 50° angle with the respective plate plane. The openings in the plates of an air outlet can have different inclinations. In particular, the openings situated in the outer area of the outlet can have a greater inclination than those lying in the inner area.

Concerning the plates used as vanes, a thickness of approximately 3 mm is recommended compared to a standard vane thickness of approximately 1 mm. This assures that the openings produce a distinct division of the air flow into individual partial currents.

A diverging, diffused discharge is attained when the axes of the duct-type openings have different directions. A certain divergence of the diffused discharge is achieved even if each plate is provided only with openings having axes in the same direction, and when the axial directions of the openings of at least two plates differ. For example, plates with upward slanting and downward slanting openings can be alternated.

To guarantee a refined, diffused discharge out of the air outlet in the closed state of the plates, it is recommended that the axes of the duct-type openings of each plate have different directions. According to the arrangement of the duct-type openings in the plates, different contours of the diverging, diffused discharge can be generated in the closed position of the plates. An air outlet having an air discharge with a characteristic turbulent swirl is obtained, for example, when the duct-type openings in the plates are arranged so that, in the closed position of the plates, the openings form an inner discharge zone and an outer ring-type discharge zone surrounding the inner discharge zone, and furthermore, when the openings are inclined in the circumferential direction of the respective ring-type discharge zone and the openings of the inner discharge zone are inclined opposite to the inclination of the openings of the outer discharge zone. In the case of such a refinement of the plates, one attains a uniform air distribution over the entire discharge radius and a stable discharge action. Such an air outlet can be realized, for example, with four or five plates, such that two plates can have a similar design, relative to the duct-type openings.

A fanning out of the air flow into a multitude of air jets with or without turbulent swirl can also be attained, for example, where in each plate of the air outlet has openings with two different directions and these plates relate to each other in a certain way. In one embodiment, the duct-type openings face in four different directions and are arranged in the plates in a way which allows the openings to form a regular pattern when the plates are in the closed position. In this connection, the respective duct-type openings facing the same direction can be arranged on one fourth of the exhaust surface of the air outlet. In this case, it is recommended to provide four or six plates in the air outlet. However, the duct-type openings facing in four different directions can be arranged such that, at any one time, openings facing in four different directions are distributed, respectively, on four half-surfaces of two adjacent plates. It is recommended in this case also to use four or six plates for the air outlet. The plates in both of these variants can have a similar design, as far as the openings are concerned.

However, the duct-type openings in the plates can be designed so that the openings face in six different directions and so that duct-type openings in all six directions are apportioned on respective halves of the surfaces of three adjacent plates. Through such a measure, the uniform distribution of the individual air jets and the turbulent swirl of the discharging air flow is further refined.

In the open or slightly tilted position, the plates in the air outlet serve, at the same time, as directional vanes for discharging a compact jet. For this purpose, the plates can pivot on central or laterally displaced axes. To vertically align the air flow emerging from the air outlet, the housing can also be provided with two pivot pins, allowing the air outlet to swivel in a frame.

BRIEF DESCRIPTION OF THE DRAWINGS

Several exemplary embodiments of the new air outlet are shown in FIGS. 1 to 23. In particular.

FIGS. 4 to 8 depict three embodiments of individual plates which are provided with pivot pins so that the plates can swivel in the air outlet;

FIGS. 17 to 19 illustrate a further alternative embodiment of a swivelling plate;

FIGS. 20 and 21 depict two embodiments of an air outlet having swivelling plates in accordance with the embodiment of FIGS. 17 to 19;

Figure 1:
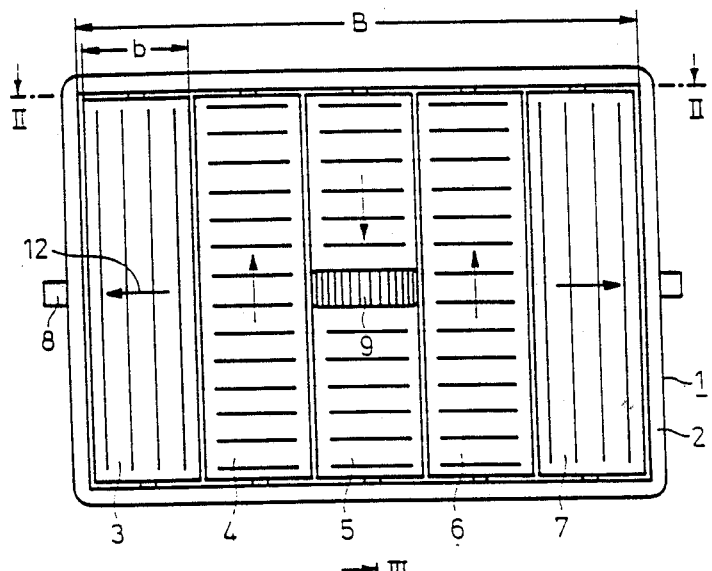
FIGS. 1 to 3 show the principal design of the air outlet in an elevation view, in a top view and in cross-section, respectively.
Figure 2:
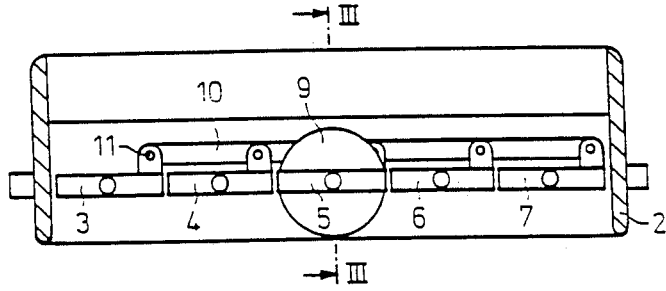
Figure 3:
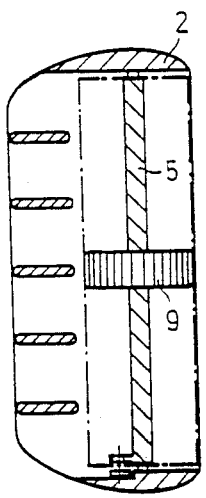

In accordance with FIGS. 1 to 3, an air outlet 1 comprises a housing 2 with five plates 3 to 7, which swivel respectively around vertical axes. The middle plate 5 is provided with a control element 9. The plates 3 to 7 are coupled to each other by means of a connecting rod 10, which is pivoted by pins 11 to the back sides of the plates 3 to 7.

For the most part, the plates 3 to 7 have a rectangular shape, with a width b which is only marginally smaller than one fifth of the inside width B of the air outlet. Each plate is provided with duct-type or slit-type openings, which are not further described and are only sketched in FIG. 1. When the plates 3-7 are in the closed state, the axes of the duct-type openings form an angle of approximately 30° to 60° with the respective plate surface and thus, with the exhaust surface of the air outlet. The openings are arranged, for example, so that the air flows out of the plate 3 to the left, out of the plate 4 upwards, out of the plate 5 downwards, out of the plate 6 upwards, and out of the plate 7 to the right.

In the simplest case, the plates 3 to 7 can have a similar design, so that in their closed state the air flows out of the outlet, for example, upwards or downwards. In any case, in the closed position of the plates, the air outlet has an additional discharge characteristic. The housing 2 can be provided laterally with two axle journals 8, so that the air outlet as a whole can swivel in a frame. Furthermore, it is possible to arrange several air outlets side by side, in accordance with FIG 1, and, if indicated, to fit them in various ways with swivelling plates.

The exhaust directions of the air from plates 3 to 7 in FIG. 1 are indicated by arrows 12.

FIG. 5 shows a front view of a plate 20, and the same plate is shown in a longitudinal section in FIG. 4. The air can flow diagonally downwards out of this plate. For this purpose, the plate is provided with several duct-type or slit-type openings 21, which are arranged successively in the longitudinal direction of the plate. The axial direction of these openings forms an angle of approximately 50° with the plate plane. The segments remaining between the openings are beveled on the inside edges in the mid region of the plate, so that a portion of the flow will emerge from the plate 20 in the axial direction of the air outlet.

The plate 20 is provided on the top and bottom, respectively, with an axle journal 22 arranged in the middle, enabling the plate to swivel about its centerline. The journal 23 on the bottom right permits coupling several plates to each other by means of an attachable connecting rod.

A swivelling plate 25 is shown in a front view in FIG. 6 and in cross-section in FIG. 7. Its duct-type or slit-type openings 26 are arranged successively in the lateral direction, the openings being parallel to the longitudinal direction of the plates and inclined toward the plate plane, allowing the air to flow out of the plate to the right. The axis 28 is provided to engage a connecting rod.

FIG. 8 shows a plate 30, which can be arranged in the middle position in the case of an air outlet with five plates and is provided with a control element 32 in the form of a thumbwheel dial. The openings 31 are arranged successively in the longitudinal direction of the plate, as in the case of the plate according to FIG. 5. However, their inclination is opposite that of the openings in the plate 20 of FIG. 5, so that the air can flow upwards out of the openings.

Figure 9:
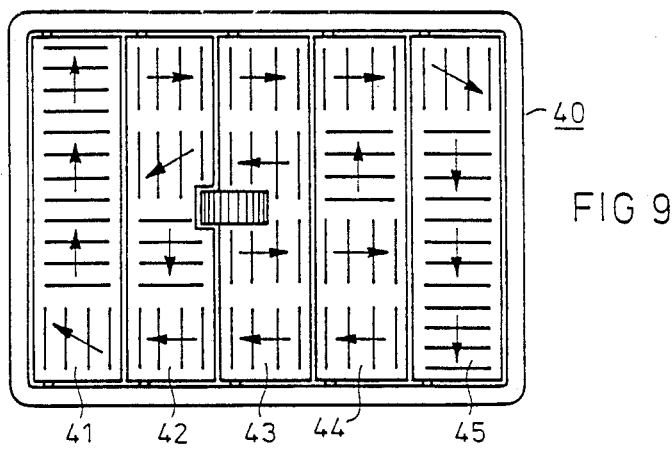
FIGS. 9 to 16 show an air outlet with an alternative embodiment of a design for swivelling plates.

FIG. 9 shows an air outlet 40 with five plates 41 to 45, each one being provided with openings facing in different axial directions. All in all, an air outlet is formed, which has an inner ring-type discharge zone and an outer, likewise ring-type, discharge zone. The openings are arranged so that they are inclined in the circumferential direction of the respective ring-type discharge zone such that the inclination of the openings of the inner discharge zone is opposite that of the inclination of the openings of the outer discharge zone.

Figures 10, 13, 14:
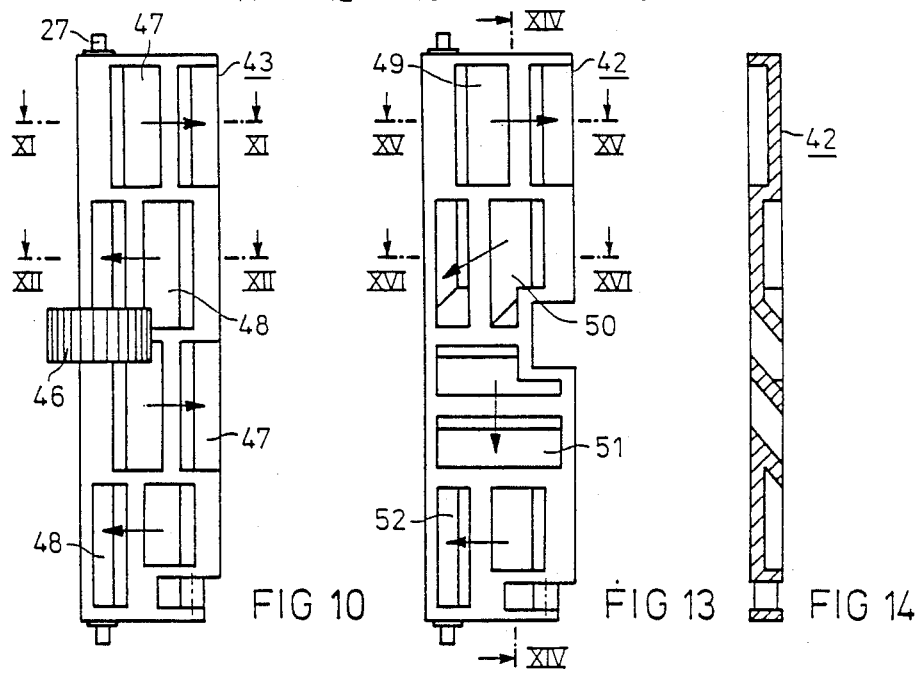
Figure 11:
Figure 12:
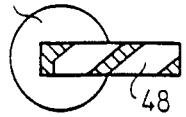

The FIGS. 10 to 12 show a front view and two cross-sections of the details of the plate 43 of the air outlet 40 according to the FIG. 9. This plate 43 is provided with a control element 46 in the form of a thumbwheel dial. The swivel axis 27 is shifted laterally from the center line of the plate. Furthermore, the plates show four discharge zones. In the upper zone, the air flows to the right, in the subjacent discharge zone, it flows to the left, in the lowest discharge zone, it flows likewise to the left, and in the overlying discharge zone, it flows to the right. Each discharge zone comprises two duct-type openings 47 and 48. On the bottom right, an axis, which is not further described, is provided to attach a connecting rod.

Figure 15:
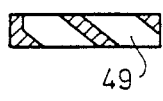
Figure 16:
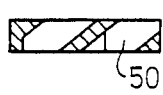

The plate 42 of the air outlet 40 of FIG. 9 is shown in FIG. 13 in a front view, in FIG. 14 in a longitudinal section, and in FIGS. 15 and 16 in two cross-sections. In plate 42, the air flows to the right through the openings 49 in the upper discharge zone to the left and downwards through the openings 50 in the subjacent discharge zone, likewise to the left through the openings 52 in the lowest discharge zone, and downwards through the openings 51 in the overlying discharge zone.

FIG. 17 shows a plate 55, which can swivel around its center axis. Its openings 56 and 56' are arranged at an angle of 45° to the swivel axis. In this plate the openings in the top half run from the bottom left to the top right, and the openings in the bottom half run from the left top to the bottom right, so that the air emerges in the direction of the arrows 59. A cut-out of such a plate is shown in a front view in FIG. 18 and in a section view in FIG. 19. The walls 57 remain between the openings. It is apparent from FIG. 19 that the axes of the openings form an angle of 45° with the respective plate plane.

FIG. 20 shows a schematic representation of an air outlet 60, which is fitted with six plates 55 designed in accordance with FIG. 17. The three left plates are arranged so that they are rotated by 180° away from the three right plates. The openings of the six plates form a regular pattern. As a result of the special relation between the right three plates and the left three plates, the air outlet has duct-type openings facing in a total of four different directions. The duct-type openings facing in the same direction are arranged on respective quarters of the exhaust surface. Altogether, four main exhaust directions result, which flow toward the corners of the air outlet and are designated by the arrows 61.

The air outlet 62 of FIG. 21 is likewise fitted with six plates. They are designed similarly to the plates 55 of the air outlet of FIG. 20; however, the axial directions of the openings are selected differently. This results in a discharge characteristic wherein the air flows out in four different principal directions, for the most part, over the lateral edges of the air outlet, as shown clearly by the arrows 63.

Figure 22:
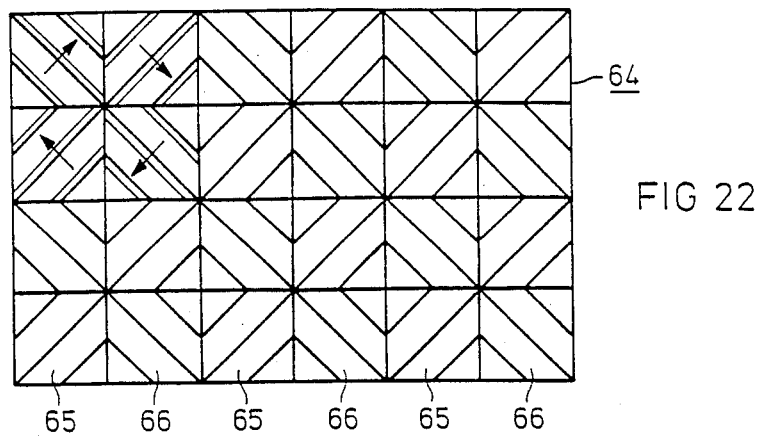
FIG. 22 shows a further alternative embodiment for the design of the swivelling plates.

The air outlet 64 of FIG. 22 consists of two plates 65 and 66, which are arranged so that they alternate repeatedly. The plates 65 and 66 have a reversed formation, that is one is rotated by 180° away from the other. In this case, openings are provided both on the top half of a plate and also on the bottom half. They run alternately from the top left to the bottom right and from the bottom left to the top right. Thus, duct-type openings facing in four different directions are arranged respectively on the half surface of two adjacent plates.

Figure 23:
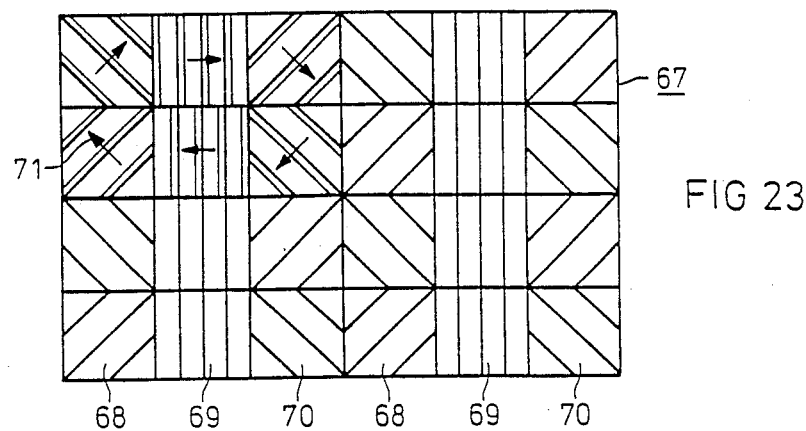
FIG. 23 depicts a still further alternative embodiment for the design and arrangement of the swivelling plates.

FIG. 23 illustrates an air outlet 67, which is comprised of three different swivelling plates 68, 69 and 70, wherein each plate exists in duplicate. Each plate has duct-type openings facing in two different axial directions both in the top half and also in the bottom half. The exhaust directions for these openings are marked with the arrows 71. Due to the fact that the openings of the plates 68 and 70 run diagonally to the swivel axis of the plate, and the openings 69 run parallel to the swivel axis of the plate 69, altogether six different exhaust directions result, which are distributed on respective halves of the surfaces of three adjacent plates.

I claim:

1. An air outlet for an interior space, the air outlet including a housing having a plurality of rectangular pivoted vanes which are coupled to each other and swivel together in the housing between a closed position and an open position, wherein the vanes comprise plates having a width equal, at the most, to the inside width of the air outlet divided by the number of plates, such that the plates can lie in a common plane when in the closed position, and each plate is provided with several duct-type openings having axes that form an angle ($\alpha$) of between 30° and 60° with the plate plane.

2. The air outlet of claim 1, Wherein the axes of the duct-type openings are inclined in different directions.

3. The air outlet of claim 2, wherein the duct-type openings in the plates are arranged in such a way that the openings in the closed position of the plates form an inner discharge zone and an outer ring-type discharge zone surrounding said inner discharge zone, the openings being inclined in the circumferential direction of the ring-type discharge zone, and the inclination of the openings of the inner discharge zone being opposite that of the openings of the outer discharge zone.

4. The air outlet of claim 2, wherein each plate has openings facing in two different directions.

5. The air outlet of claim 4, wherein the duct-type openings face in four different directions and are arranged in the plates in such a way that, in the closed position of the plates, the openings form a regular pattern.

6. The air outlet of claim 5, wherein all of the duct-type openings facing the same directions are arranged on a respective one fourth of the exhaust surface of the air outlet.

7. The air outlet of claim 5, wherein the duct-type openings facing in four different directions are distributed on respective halves of the surfaces of two adjacent plates.

8. The air outlet of claim 4, wherein the duct-type openings face in different directions, and duct-type openings of each of the six directions are distributed on respective halves of the surfaces of three adjacent plates.

9. The air outlet of one of claims 1 to 8, wherein the swivel axes of the plates are displaced laterally from the center lines of the plates.

10. The air outlet of one of claims 1 to 8, wherein the housing is provided with two pivot pins, so that the air outlet can swivel in a frame surrounding the housing.

* * * * *